June 1, 1948. O. R. PETERSON ET AL 2,442,510
CABLE WINCH
Filed April 21, 1944 4 Sheets-Sheet 2

OSCAR R. PETERSON
ROBERT A. PETERSON
INVENTORS
BY A. Dunham Owen
ATTORNEY

June 1, 1948.   O. R. PETERSON ET AL   2,442,510
CABLE WINCH

Filed April 21, 1944   4 Sheets-Sheet 3

INVENTORS
OSCAR R. PETERSON
ROBERT A. PETERSON
BY A. Dunham Olsen ATTORNEY

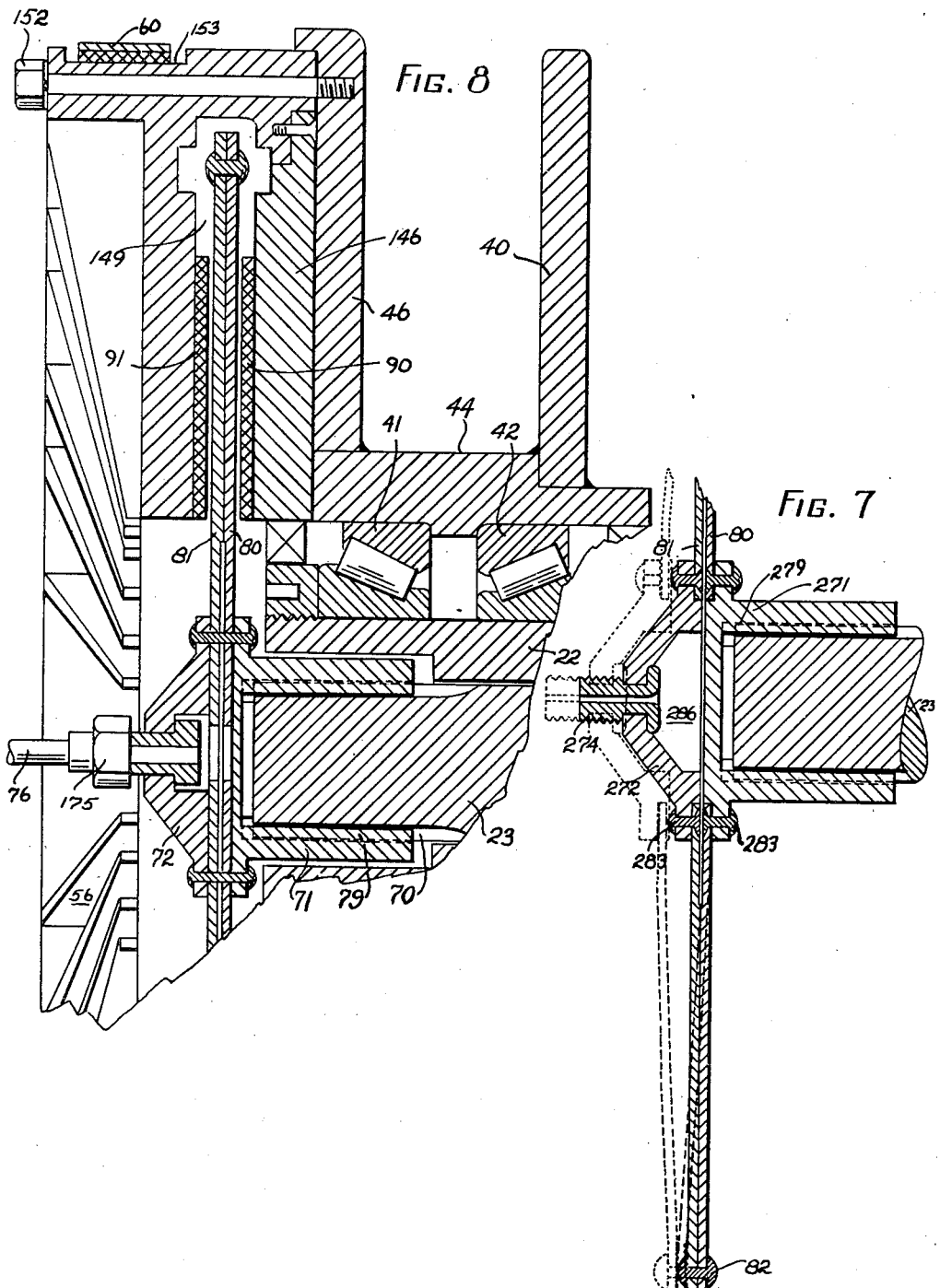

Patented June 1, 1948

2,442,510

UNITED STATES PATENT OFFICE 2,442,510

CABLE WINCH

Oscar R. Peterson, Oakland, and Robert A. Peterson, San Leandro, Calif.

Application April 21, 1944, Serial No. 532,099

5 Claims. (Cl. 254—185)

Our invention relates to power units and to parts therefor, and is particularly well adapted for attachment to tractors and other mobile self-powered vehicles.

The tremendous expansion in the uses for tractors and similar vehicles and their shipment to many isolated and mechanically undeveloped countries has accentuated the ever present problem of repair maintenance and operation. The present war has seen these tractor units among the first to be landed in an amphibious attack on remote islands. It is extremely important that such vehicles be rugged, and also that the parts subject to wear and replacement shall be quickly replaced when worn out, and easily accessible and self-adjusting. It thus becomes important that any replacement operations be reduced to the simplest acts. It is important that these replacements shall not require any delicate gauges, shimming, or fitting of the new part or parts. Of equal importance is the time saved in the manufacture of the parts and in original assembly, where our invention is used, for it eliminates many parts heretofore required. It is important in the original factory assembling of the unit as well as when getting at the worn part to replace it, that no adjustments are necessary. In our device no bearings or other delicately adjusted parts need to be removed and replaced or readjusted after the new part is in place.

The ideal is to have the new part available as a complete sub-assembly or replacement unit, adapted to slide into place and adjust itself automatically to whatever may be the worn condition of the related parts, and to have the worn parts accessible without displacing any bearings or other delicately adjusted parts.

The present invention solves the above problems, and among other things, has for its objects to provide a winch or power unit in which all the parts subject to wear, such as the driving clutch, and the brakes, are removable without disturbing any bearings or shafts or actuating levers; to provide a novel, full floating clutch, which floats on the end of a splined or equivalent shaft and can be placed on or removed from the end of the shaft without having to sever any connection with the shaft; to provide a clutch in which the actuating means is external to and unconnected with the other rotating parts of the winch; to provide an easily replaceable clutch which can be assembled in the power unit without special tools and which, when in place, will automatically adjust itself and maintain its adjustment, so that it is truly foolproof; to provide a clutch replacement unit which can be sent out by the factory ready to install merely by sliding in place, and which automatically assumes its correct spacing in relation to its associated clutch members; and to provide a winch in which the elements subject to heating, such as the clutch, are adjacent the open end of the winch so the heat from friction of the parts is readily dissipated.

Another object of our invention is to provide a compact streamlined unitary winch which may be located forward or aft in a power driven vehicle, and which is operable by remote control.

Another object of our invention is to provide a novel form of brake which is self-releasing in one direction and self-energizing in the other direction.

Another object is to provide a winch in which the lead-in sheave is located substantially in line with the drawbar on the vehicle, whereby the pitching effect of the vehicle will be minimized in its effect on the cable.

Another object of our invention is to achieve the ultimate in simplicity by the elimination of parts and weight in manufacture.

Several embodiments of our invention are described and illustrated herein to comply with U. S. Revised Statutes Sec. 4888. By doing this we do not intend to limit our invention to these embodiments, but assert the right to full equivalency of the elements set forth in the claims.

In the drawings, in which similar reference numerals are used:

Fig. 7 is a cross-sectional view of another modified form of hub and clutch member; and Fig. 8 is a cross-sectional view of a modified form of radial clutch pocket.

Figure 1:
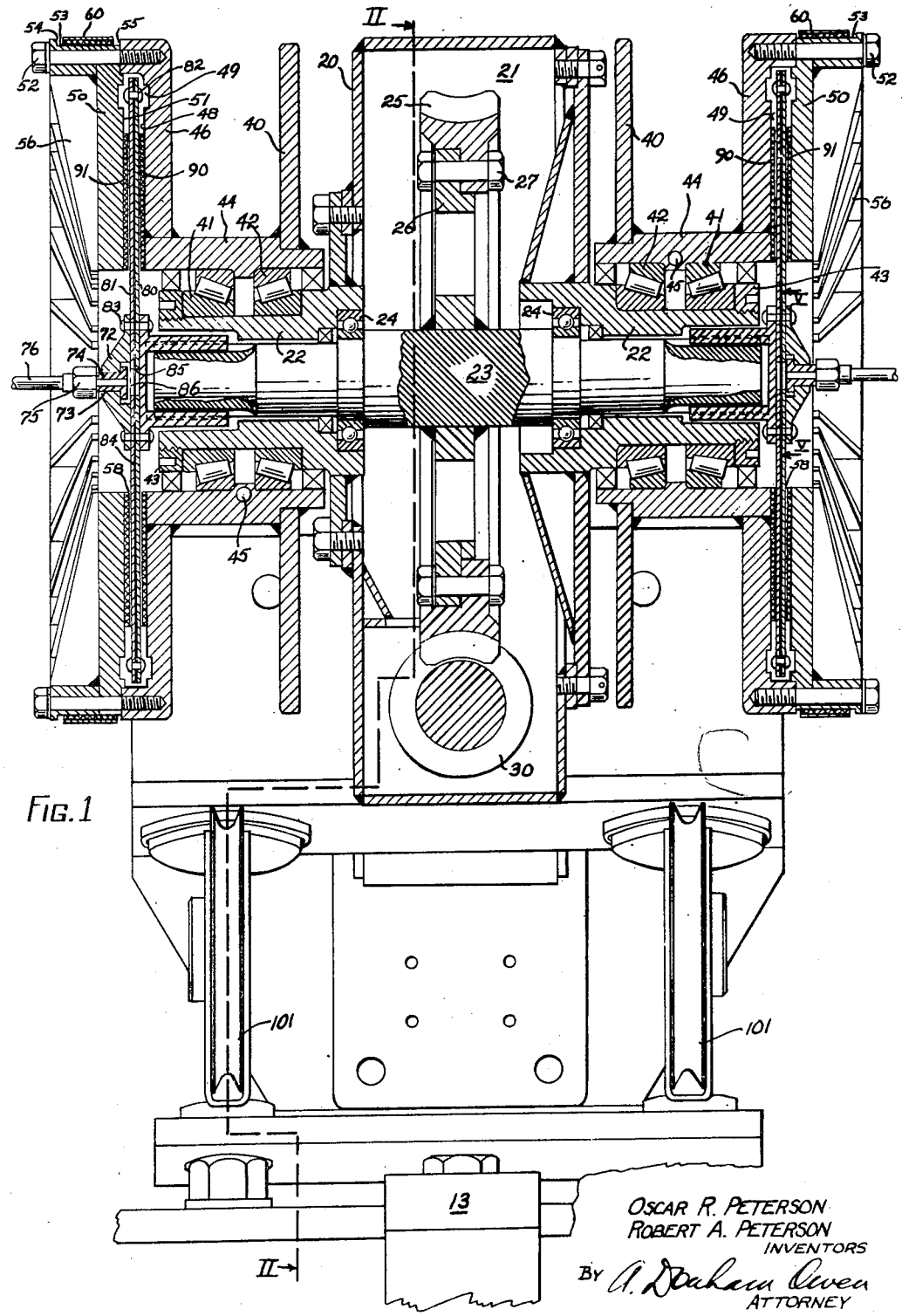
Fig. 1 is a view in elevation of a portion of the back end of a tractor just above the drawbar, with the winch or power unit shown mostly in cross-section.
Figure 2:
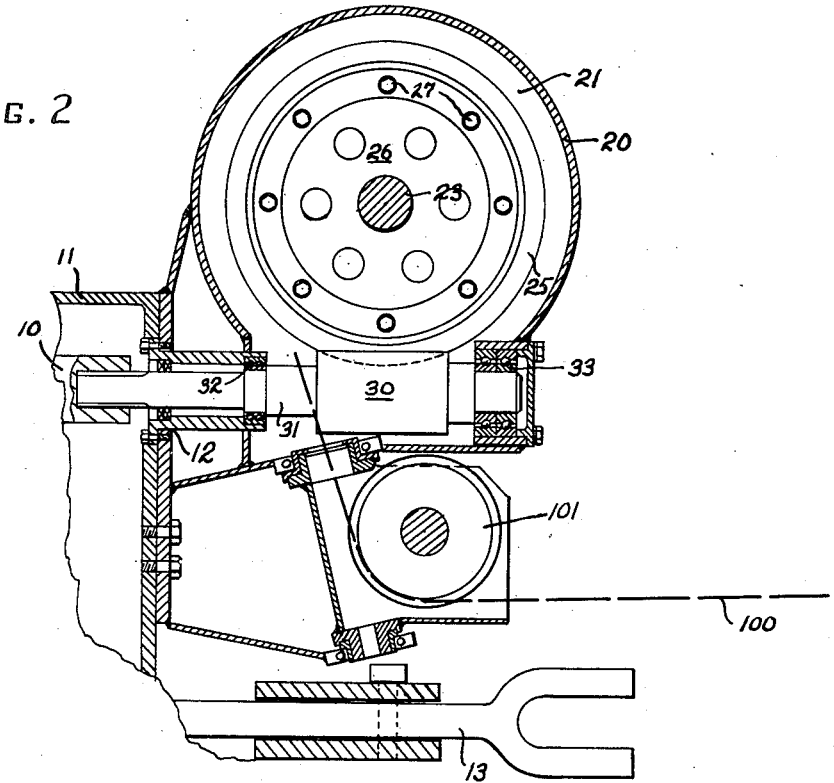
Fig. 2 is a side view taken on the broken line 2—2 of Fig. 1.

It is now general practice in tractors and other mobile self-powered vehicles to provide somewhere on the vehicle frame an auxiliary drive shaft connected to the power source and useful to drive auxiliary equipment. This shaft 10 may be at the rear, front or either side of the vehicle. Most equipment for earth moving has the shaft 10 located at the rear end of the vehicle frame 11, adjacent an opening 12, because the power transmitted through this shaft is used to actuate the movable members on a scraper, crane, etc., hitched to the tractor by the drawbar 13, or to raise and lower a bulldozer supported on the tractor. The present invention relates to improvements in a power unit to convert the vehicle power into usable form for and on these pieces of attached equipment. Ours is not the first power unit, but it is the first to solve the problems of quick action in going from power to brake to power, of easy, foolproof, and quick original assembly and field repair by the most inexperienced repairman, and the problem of remote control with great simplification of the parts.

The winch or power unit of our invention will include some form of a housing 20 having a central gear case portion 21 with projecting tubular drum supporting housings 22. The main drive shaft 23 extends through housings 22 and is journaled in suitable bearings 24. A worm gear 25 is fixed to said drive shaft 23. For the purposes of illustration, we have shown a web 26 welded to the drive shaft 23 and having the worm ring gear 25 removably secured at the outer periphery of the web by means of suitable bolts 27. While we have shown a worm gear secured to shaft 23, a beveled, or a hypoid, or any other form of reduction drive may be used in carrying out the purposes of our invention. The form of housing, or how the main shaft 23 is made to rotate, is not important in our invention. In the illustration, the worm gear 25 is engaged by a worm 30 rigidly secured to stub shaft 31, journaled in bearings 32, 33 in the gear case housing 21. The stub shaft has its forward end splined or squared, or otherwise shaped, to interlock with the auxiliary drive shaft 10.

On one or both of the tubular drum supporting housings 22 a drum 40 is rotatably mounted by means of the tapered anti-friction bearings 41, 42. Each drum 40 is freely rotatable around its drum housing. It is held on by the lock nut 43. The cylindrical hub 44 of each drum or spool is adapted to have cable wound upon it. To fasten the cable, one end can be inserted in the hole 45 which hole is bored through the drum on the line of a chord. The outer radial wall 46 of each drum has provision near its periphery to have secured to it an inwardly projecting radial wall drum plate member 50 with its radial face 51 spaced apart from the radial face 48 of the member 46 thereby providing a radial pocket 49. The provision for connecting the two members 46 and 50 may be in the form of cap screws 52. Adjacent the perimeter of the drum plate 50 is a brake drum surface 53 having ledges 54 and 55 between which a brake band 60 floats. The braking effort of this brake band is thus transmitted through the cap screws 52 to the drum 40. Radial fins 56 are secured to the outer radial wall of the drum plate 50 and function to strengthen the inwardly projecting radial member 50 as well as to conduct heat from its inner face 51 or from its braking surface 53 when produced by friction. Around the perimeter of the radial pocket are openings or vents 57 which permit self removal of any foreign matter which may enter the pocket 49 at 58. Centrifugal force and the flow of air will eventually work it out the openings 57.

The ends of main drive shaft 23 are splined at 70 so as to receive with a sliding fit the female clutch hub member 71.

The clutch member (see Fig. 4), adapted to slide into position on the splines 70 at each end of the main drive shaft 23, is preferably made as an integral unit and comprises the female hub member 71 with spline receiving slots 79, and a complementary hub member 72 having a bore 73 in which is rotatably fitted a hollow bushing 74 adapted to be connected by a clamping nut 75 to a tubular conduit 76. The hollow bushing 74 is free to stand still in the bore 73 when the clutch hub members 71 and 72 rotate. Secured between the two clutch hub members 71 and 72 are a pair of flexible plates 80, 81, which plates are secured together adjacent their periphery by rivets 82 (or otherwise) with an airtight fit. To obtain this airtight fit when the plates 80 and 81 are of saw blade steel it is sometimes necessary to use a composition filler to seal the peripheral joint. The inner periphery of plates 80, 81, is likewise riveted together by rivets 83 between the clutch hub members 71, 72. The fit between the clutch hub members 71, 72 and the plates 80, 81, is an airtight fit. To conduct air or other form of fluid pressure in between plates 80, 81, shallow radial slots 84 (see Fig. 5) extend from the inner periphery 85 of the plates 80 and 81 outwardly to a point beyond the rivets 83. In this way when air or other fluid pressure is conducted through conduit 76 into the hollow portion 86 of the clutch hub it passes on out through the shallow conduits 84 and between the plates 80, 81, causing these flexible plates to expand or separate from each other. When they expand they come into engagement with linings 90 and 91 secured in the radial pocket 49 to the inner surfaces 48 and 51 respectively, of members 40 and 50. This frictional engagement between the clutch plates 80 and 81 and the linings 90 and 91 provides the driving connection between the main drive shaft 23 and the drum 40. It is contemplated that the linings 90 and 91 may be secured to the plates 80 and 81 instead of to the plates 48 and 51.

Figure 6:
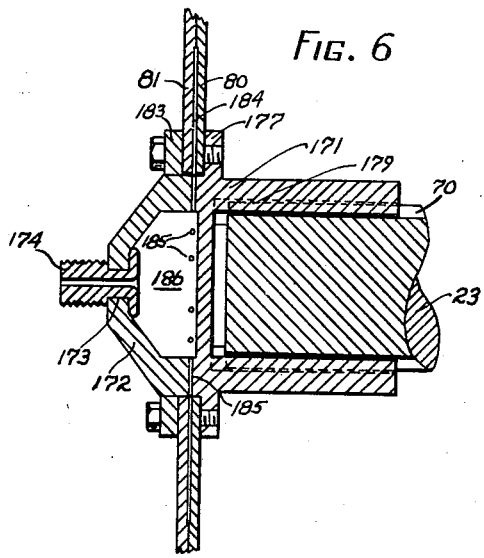
Fig. 6 is a cross-sectional view of a modified form of hub.

While we have described one way of mounting the expansible plates 80, 81 to the hub 71, 72, other ways of mounting are feasible and are disclosed in Figs. 6 and 7.

In Fig. 6, the hub 171 is made in one piece, having the spline receiving slots 179 to fit the splines 70 on the main shaft 23. The flexible plates 80, 81 are secured to the flange 177 by a collar 183 fitted around the cylindrical portion of the hub housing 172. In the housing 172 is a bore 173 in which is rotatably fitted the hollow bushing 174. The chamber 186 in the housing 172 has a plurality of holes 185 which communicate with the shallow grooves 184 cut in the plates to conduct the fluid pressure medium out between the plates 80 and 81.

In Fig. 7 is another modified form of clutch member comprising the hub 271 with the spline receiving grooves 279, and the complementary hub member 272. The latter has the hollow bushing 274 arranged to convey fluid pressure into the space 286. In this modification the flexible plates 80 and 81 are secured together at their outer edges by the rivets 82, but at their inner edges the plate 80 is secured to the hub member 271 and the plate 81 is secured to the hub member 272, either by screws or other fastening means. With this construction, the hub parts 271 and 272 will move apart axially when fluid pressure fills the space 286. The dotted lines show this. The net effect is the same, namely, to bring the plates 80 and 81 out into frictional engagement with the linings 90, 91 of the radial pocket 49.

While we are describing and illustrating this power unit as a tandem or twin drum device, it is equally valuable if made with a single drum. The claims appended hereto contemplate a device either with a single or with two or more drums.

The equipment attached to the tractor is actuated by a cable 100 which is led in to the power unit over a sheave 101 and thence to the hub 44 of drum 40. It is important that the operator should be able to change the direction of movement of the cable as quickly as possible. The present invention makes possible a practically instantaneous reversal of direction of drum 40.

The brake band 60 is carried on the brake drum 53 attached to the cable drum 40. It is mounted and actuated (see Fig. 3) so that when the drum 40 and attached plate 50 are driven by the clutch on main shaft 23 the brake effects its own release, but the instant the clutch lets go, the brake will take hold and will not permit any reverse movement of the drum 40. In going from the situation where the brake 60 is holding the drum against rotation to the situation where the clutch is driving the drum, it is desirable not to have any slippage or reversal in rotation of the drum 40. A third desirable operational characteristic is that, when desired, the drum 40 may run free to drop the load held up by the cable 100.

Figure 3:
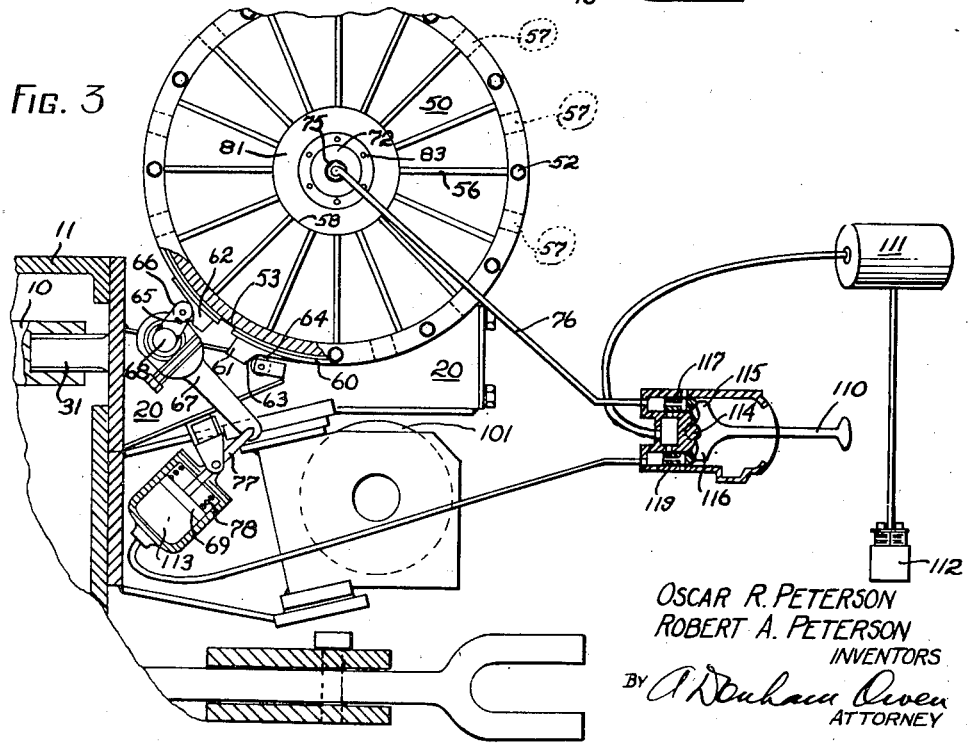
Fig. 3 is a side view in elevation showing the brake mounting; with a portion of the brake drum cut away.

The details of the brake mounting which make possible these three conditions are shown in Fig. 3. On the ends of the brake band 60 are the projecting members 61, 62, preferably made alike so that the brake band is reversible. The tapered cam face 63 on projection 61 normally bears against the roller 64 secured to a fixed projection on the housing 20. The tapered cam face 65 on the other projection 62 is engageable by the roller 66 mounted on the end of the brake control bell crank lever 67, which lever swings around a pivot 68 and is moved by the spring 78 to apply the brake and by the air chamber piston 69, through the connecting rod 77 to release the brake.

Looking at Fig. 3, let us take the condition with all the parts at rest. The spring 78 is maintaining a yielding pressure on the roller 66 adjacent the cam face 65 and this holds the brake band 60 tightly wrapped to the brake drum 53. The main drive shaft 23 is revolving and the clutch plates 80, 81 are revolving, but are out of contact with the clutch faces 90, 91 in the radial pocket 49. The cable 100 is wound on the drum 40 in a clockwise direction. The complete cycle of operations is carried out by the remote control lever 110, located anywhere on the vehicle, which actuates the valves that admit and release the fluid actuating pressure. This pressure may be air, oil, water or any other fluid medium, and it is stored under pressure in a tank 111 by means of a compressor 112. From this tank the fluid under pressure is admitted by the control lever 110, through valves, either to the brake release cylinder 113 or into the clutch conduit 76. Any form of control and valve arrangement may be used and the one described is a suitable form.

The control lever 110 is pivoted at 114 and has the arms 115 and 116. The arm 115 when moved to the left by lifting the handle 110 engages a suitable valve stem which opens a valve 117 to admit fluid pressure to engage the clutch.

When the clutch takes hold and the drum 40 rotates clockwise, the brake band 60, still gripping the drum 53, will also start to rotate, but as it does so it will do two things, it will move the projection 62 to the left as this rotative force is greater than the force applied by the spring 78, and it will lift the tapered face 63 away from the fixed roller 64. This will relieve the band 60 throughout its major portion. The only portion of the band 60 that will be in braking contact with the brake drum 53 will be that portion near its end projection 62. This end of the band 60 will be held in frictional contact with the drum 53 by means of the tapered face 65 bearing against the spring pressed roller 66. This frictional contact will remain all the while the drum 40 is rotating but it is not sufficient to cause any appreciable loss of power. The function served by this frictional engagement is important. When the clutch is released and ceases to rotate the drum 40 in the clockwise direction and the load starts to rotate the drum 40 in a counter-clockwise direction the frictional engagement just described carries the brake band 60 in a counter-clockwise direction until the tapered face 63 contacts the fixed roller 64. This roller acts against the tapered face to crowd that end of the brake band 60 in against the brake drum 53. This stops any further rotation of the brake band 60 and also of the drum 40, because the pressure exerted on the other end of the band 60 through the tapered face 65 by the spring pressed roller 66 will press that end of the band in against the brake drum 53, so that the force acting to rotate the drum 40 is converted into energy to wrap the brake band tightly around the brake drum 53.

The load being sustained by the brake might be a lifted bulldozer blade, a scraper bucket, or any other type load which would be putting a pull on the cable 100. When the operator desires to drop the load he moves the control lever 110 downwardly and this causes the arm 116 to engage the valve stem of the valve 119 to open it, thereby admitting fluid pressure into the brake release chamber 113. This lifts the piston 69 which moves the roller 66 away from the tapered face 65 and releases the brake band 60. The operator, by rocking the control lever 110 up and down, can obtain practically instantaneous change from any one of the three conditions, either to lift the load, to hold the load, or to release the load.

An important feature of our invention is that this control is remote and is achieved without any complicated operating rods or mechanisms. In the case of the clutch, the only connection is through the outside conduit 76 held on by the nut 75. In the case of the brake there is no fixed connection to the band 60, so that by rotating the roller 66 to the left, the whole band 60 can be lifted out and a new one installed in as short a time as it takes to tell about it.

In operation under conditions of dust and sand, the only two parts subjected to wear are the clutch and the brake and these are easily renewed. Also we have lengthened the life of the clutch by providing a self-venting of the radial clutch pocket 49 so that any sand or grit entering at 58 will soon remove itself through the openings 57. While in the radial pocket 49 the dust and sand is subject to centrifugal force as well as a similar centrifugal flow of air, both tending to throw it out the vents 57.

The important advance achieved by our clutch arrangement will be appreciated when it is seen that to install a new or replacement clutch it is only necessary to remove the 12 cap screws 52, unfasten the fluid conduit 76 by removing the nut 75 and then lift off the radial drum member 50. This leaves the clutch fully exposed and by taking hold of the hollow bushing 74 it can be slid off the end of the main shaft 23. As easily, a replacement clutch unit (see Fig. 4) can be slid back on the shaft 23. No time or skill is required to adjust this new clutch on the shaft 23, as it is self-adjusting. Next, the radial drum member 50 is replaced and the conduit 76 is replaced and the new clutch is ready to operate. Introduction of fluid pressure through the conduit 76 into the clutch hub 86 and out through the slots 84 will cause the clutch plates 80, 81 to bulge sidewise into engagement with the clutch lining 90, 91 in the radial pocket 49. The first time this is done after installing a new clutch, the hub 71 will adjust itself axially along the splines 70 to its correct central position.

Another advantage of our invention is that these clutch units can be made up at the factory and sent out complete, as a subcombination ready to be installed in the field, where they will require no adjustment or tinkering, or delicate interfitting with other parts of the device.

Figure 4:
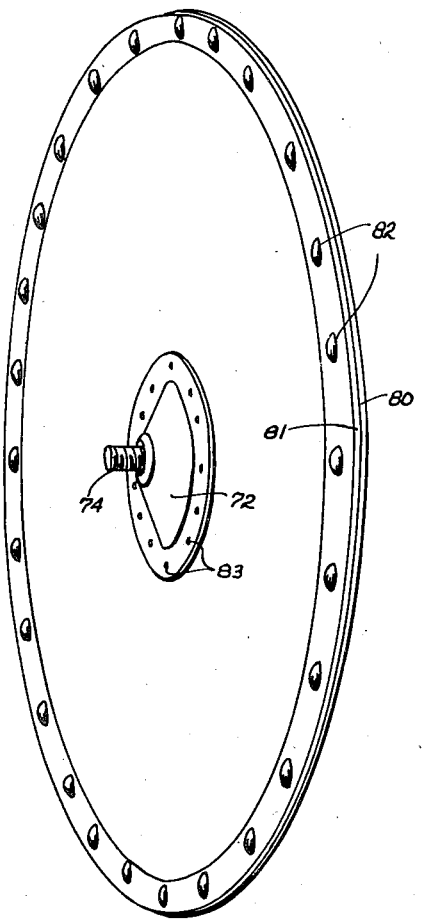
Fig. 4 is a view in perspective of the clutch sub-assembly unit.
Figure 5:
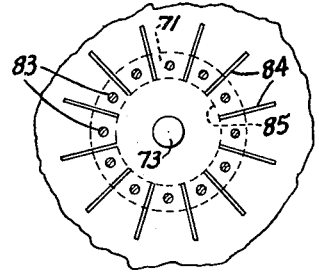
Fig. 5 is a view of a portion of the clutch hub taken on line V—V in Fig. 1.

Instead of having the clutch replacement unit comprise only the parts shown in Fig. 4, thereby occasionally requiring renewal in the field of the linings 90 and 91 on the faces 48 and 51 of the pocket 49, there is a certain advantage in having the whole of the clutch elements made up at the factory as a replacement unit. This we have illustrated in Fig. 8. The drum 40 has provision on its outer face to have secured to it by cap screws 152 a complete clutch pocket 149, in which the factory has placed the expansible plate members 80 and 81. Also renewed in this way is the brake surface 153. The service man in the field makes the whole clutch change in about 5 minutes, by removing the cap screws 152 and the conduit nut 175. With these removed, the whole pocket unit, and the plate unit, slide off together and the new one slides on. When the cap screws 152 and the nut 175 are replaced the brake band slips back on and the power unit is ready to work.

From the foregoing description of our invention its many advantages become apparent. Not only does it achieve great economies in manufacture because of requiring fewer parts to be made, but it also effects great economies in assembly costs, both in the original factory assembly and in replacement in the field. Its value next becomes apparent in use, where the remote control, with lightning-like rapidity, from lifting to holding to dropping or vice versa achieves a better result than in any device heretofore known.

We want it distinctly understood that our invention does not reside in the particular design of any of the parts, as these may be varied to suit manufacturing progress and the various materials used. Also, while we have described our invention as applied to a power unit or winch we understand the word power unit or winch to be used in a broad sense as meaning any environ where the elements in the claims are used to convey power.

What we claim as our invention is:

1. In a power winch, the combination of a housing, a driven shaft rotatably mounted therein and extending therefrom, a drum rotatably mounted on said housing in coaxial relation to said shaft near its end, and having an annular radial pocket with vents around its periphery connected to said drum and having a removable wall forming its outer side, a fluid expansible clutch member in the radial pocket adapted to engage the opposite radial walls of said pocket whereby a connection may be established between said shaft and said drum, means for expanding said clutch member, said clutch member having a hub in axially slidable non-rotative fit on the exposed end of said shaft, whereby said clutch may be removed simply by sliding its hub off the end of said shaft upon removal of said removable wall, and when in place on said shaft said clutch will automatically position itself in said radial space.

2. In a power winch, the combination of a housing, a driven shaft rotatably mounted therein and extending therefrom, a drum rotatably mounted in coaxial relation to said shaft near its end, and having secured to its periphery a removable, inwardly extending radial member axially spaced from the outer face of said drum the connecting wall between said radial member and said drum having openings therein whereby any foreign matter getting into the radial pocket will vent itself, a fluid expansible clutch member whereby a connection may be established between said shaft and said drum, means for expanding said clutch member, said clutch member being located in the radial pocket between said radial member and the outer face of said drum and having an axially slidable non-rotative fit on the exposed end of said shaft, whereby said clutch may be removed simply by sliding it off the end of said shaft upon removal of said radial member, and when in place on said shaft said clutch will automatically position itself in said radial space.

3. In a power unit, the combination of a housing having a gear case portion and a drum mounting portion; a drive shaft and a driven shaft with a power reduction drive connecting them; a drum rotatably mounted on said housing, said drum having a cable receiving spool, having the outer wall of said spool form one face of a clutch, with an axially spaced apart wall member removably secured near the outer periphery of said spool wall, to form the other cooperating face of said clutch and a radially inwardly extending pocket, and wherein said peripheral rim of said pocket has openings therein to vent said pocket of foreign matter; an expansible clutch member adapted to engage said walls in said pocket and having a hub axially slidable and non-rotatably secured on the end of said driven shaft, said clutch member being self-positioning on said shaft and held thereon only by said face member, a conduit secured to the non-shaft side of the hub of said clutch member for conducting fluid pressure to said clutch member, whereby upon assembly of said power unit, the clutch member and its associated face member on the spool are the last parts assembled and said clutch member will automatically adjust itself in correct operative position on said driven shaft.

4. In a power unit, the combination of a housing having a gear case portion and drum mounting portions; a drive shaft and a driven shaft with a power reduction drive connecting them; drums rotatably mounted on said housing, each drum having a cable receiving spool, and having the outer wall of its spool form one face of a clutch, with an axially spaced apart clutch face member removably secured near the outer periphery of said spool wall, to form a radially extending pocket between said faces, and wherein said peripheral rim of said pocket has openings therein to vent said pocket of foreign matter; an expansible clutch member in each pocket adapted to engage said faces, each clutch having a hub slidably and non-rotatably secured on one end of said driven shaft, each clutch member being self-positioning on said shaft and held thereon only by its adjacent face member, a conduit secured to the non-shaft side of the hub of each clutch member for conducting fluid pressure to said clutch member, whereby upon assembly of said power unit, the clutch members and their associated face members on the spool are the last parts assembled and each clutch member will automatically adjust itself in correct operative position on said driven shaft.

5. In a power unit, the combination of a housing having a gear case portion and drum mounting portions; a drive shaft and a driven shaft with a power reduction drive connecting them; drums rotatably mounted on said housing each drum having a cable receiving spool, and a connected inwardly extending annular pocket with one radial wall removably secured near the outer periphery of said pocket; an expansible clutch member in each pocket, each clutch having a hub slidably and non-rotatably secured on one end of said driven shaft, each clutch member being self-positioning on said shaft and held thereon only by its adjacent face member, a conduit secured to the non-shaft side of the hub of each clutch member for conducting fluid pressure to said clutch member, whereby upon assembly of said power unit, the clutch members and their associated removable radial walls are the last parts assembled and each clutch member will automatically adjust itself in correct operative position on said driven shaft.

OSCAR R. PETERSON.
ROBERT A. PETERSON.

REFERENCES CITED

The following references are of record in the file of this patent:

UNITED STATES PATENTS

| Number | Name | Date |
|---|---|---|
| 427,085 | Jones | May 6, 1890 |
| 1,564,717 | Scruby et al. | Dec. 8, 1925 |
| 2,136,111 | Laurent | Nov. 8, 1938 |
| 2,138,824 | Yount | Dec. 6, 1938 |
| 2,178,280 | Hutchins et al. | Oct. 31, 1939 |
| 2,307,456 | Fawick | Jan. 5, 1943 |